Aug. 4, 1964 T. J. HAMILTON 3,143,326
ADJUSTABLE SEAT
Filed May 31, 1962 2 Sheets-Sheet 1

INVENTOR.
TED J. HAMILTON
BY
Huebner & Worrel
ATTORNEYS

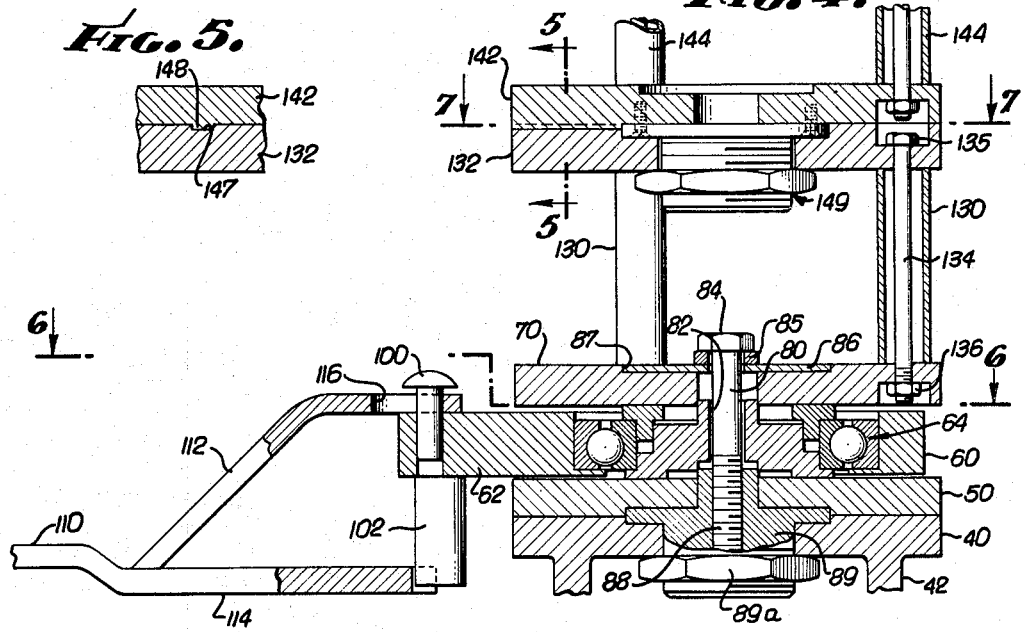
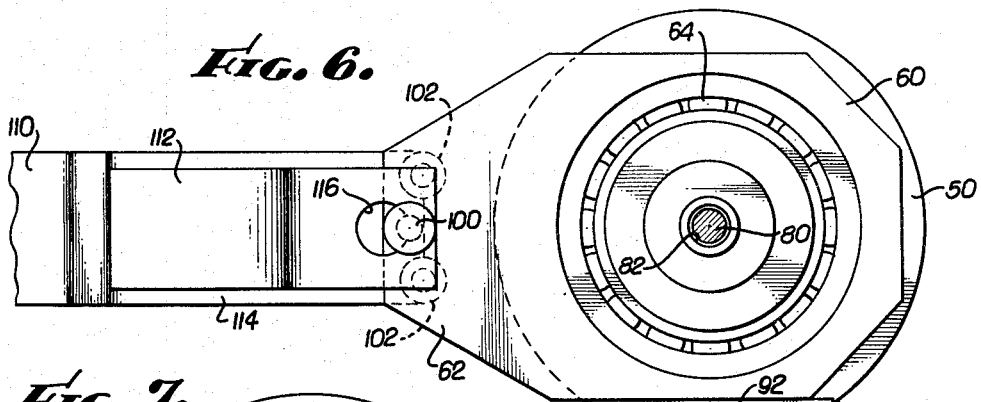
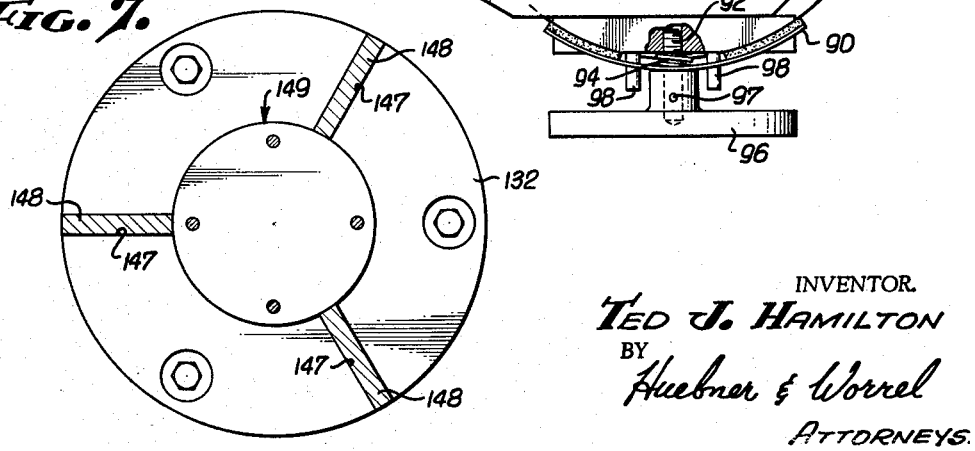

United States Patent Office 3,143,326
Patented Aug. 4, 1964

3,143,326
ADJUSTABLE SEAT
Ted J. Hamilton, 13445 Blythe St., Van Nuys, Calif.
Filed May 31, 1962, Ser. No. 199,122
7 Claims. (Cl. 248—122)

This invention relates to an adjustable seat, and more particularly, to a seat primarily designed for mounting on a motion picture camera dolly, the seat being readily adjustable to provide an infinite variety of selected positions relative laterally to the camera, and being positioned to be raised and lowered with the dolly, so that the cameraman may be continuously, comfortably seated in an effective operating position close to the eye piece or finder of the camera and the camera directional control mechanism regardless of the movement of the camera.

Although the use of the invention as herein described is limited to use in connection with a motion picture camera dolly, nevertheless, it will be obvious that the invention may be applied to other uses where it is desired to maintain an operator in a comfortable, effective position during manipulation of other forms of equipment, such as the microphone boom in general use in motion picture and television studios, and construction crane equipment.

Concerning the operation of motion picture cameras, particularly those mounted on movable dollies, it has generally been found desirable to provide a seat for the cameraman so that his effective operation of the motion picture camera will not be disturbed by movement, sometimes rapid, of the dollies to various positions on the studio floor. Generally, such seat has been mounted on the dolly carriage itself, separate from the dolly, and such seats have been found to be inefficient, because they have been in static position relative to the camera, and the cameraman, resting on such seat, has had to make rapid adjustment of his body positions as the camera swings about on the dolly and as the dolly is raised and lowered.

It is therefore an object of the invention to provide a seat which is mounted on the dolly itself, and may thus be raised and lowered with the upward and downward movement of the dolly, and which may also be rapidly and smoothly rotated laterally so that the cameraman may easily swing about as the camera is moved about, and may easily maintain his position with his eye at the camera finder and his hands on the camera directional control mechanism.

It is another object of the invention to provide such a seat which may be readily and firmly mounted on the dolly, and also may be readily removed therefrom when desired.

It is yet another object of the invention to provide such a seat which is sturdy in construction, but relatively light in weight.

It is a further object of the invention to provide such a seat which is easy to maintain.

With these and other objects in view, the invention consists of the construction, arrangement and combination of the various parts of the device whereby the objects contemplated are attained, as hereinafter set forth, pointed out in the appended claims, and illustrated in the accompanying drawings.

In the drawings:

FIGURE 4 is an enlarged view taken on the line 4—4 of FIGURE 2.

FIGURE 5 is a view taken on the line 5—5 of FIGURE 4.

FIGURE 6 is a view taken on the line 6—6 of FIGURE 4.

FIGURE 7 is a view taken on the line 7—7 of FIGURE 4.

A dolly carriage 10 has wheels 12 and 14, and a power source, such as a battery disposed in a battery box 16. Wheels 14 may be steered by steering handle 18.

Figure 1:
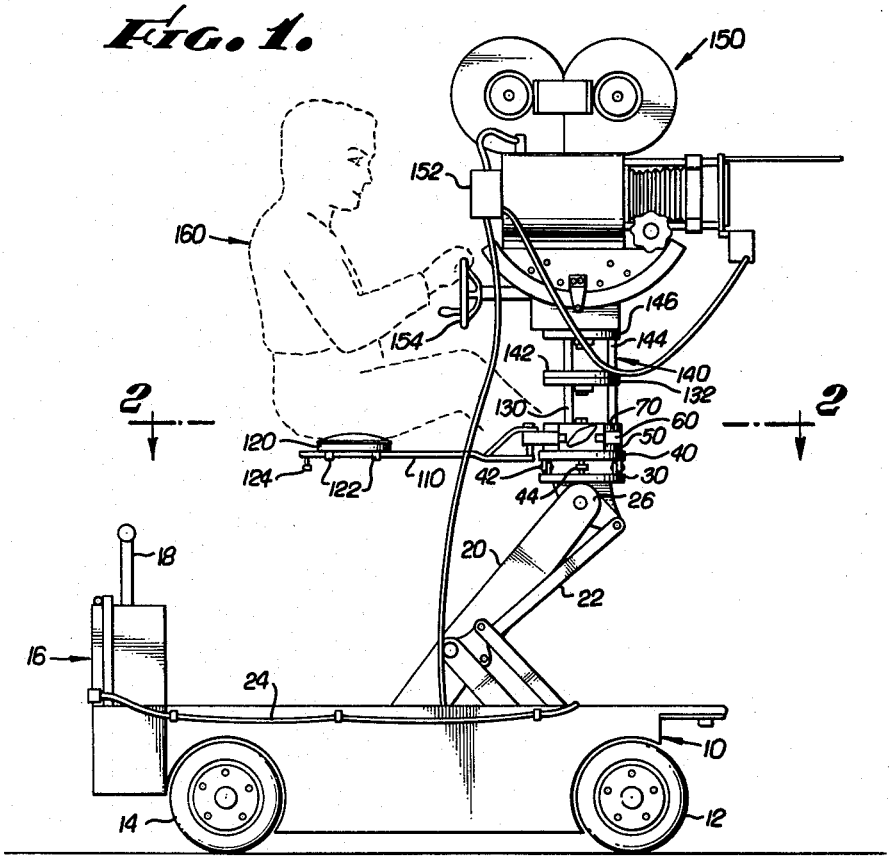
FIGURE 1 is a side elevational view of a motion picture dolly with the seat of the present invention mounted thereon.
Figure 2:
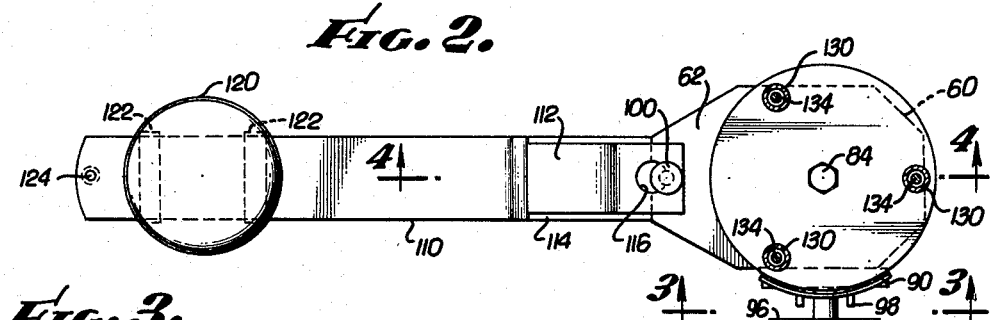
FIGURE 2 is an enlarged view taken on the line 2—2 of FIGURE 1.
Figure 3:
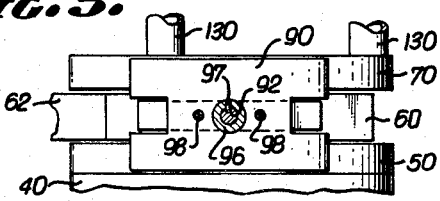
FIGURE 3 is a view taken on the line 3—3 of FIGURE 2.

Carriage 10 supports a camera dolly, which, as illustrated in FIGURE 1 of the drawings, may be what is known in the trade as a "crab dolly," having an elevator arm 20 pivotally mounted at its lower end to carriage 10. Associated with arm 20 is an elevating and lowering mechanism 22 disposed so as to raise and lower elevator arm 20 and maintain it at any desired elevation. Mechanism 22 is operated by an electric motor (not shown) mounted on carriage 10, said motor being connected by a cable 24 to the battery power source.

Pivotally mounted at the upper end 26 of elevator arm 20 is a round support plate 30. A second round plate 40 is suspended above plate 30 and is adjustably supported on plate 30 by any suitable means, such as by pivotal connections 42 and a screw adjustment 44.

Mounted on second plate 40 is a third round plate 50. Plate 50 slidably supports a fourth plate 60. Plate 60 is substantially round, but it has an outwardly protruding extension 62 which extends beyond plates 30, 40, 50, and a fifth plate 70, hereinafter described, and serves as a support for the seat frame structure, also hereinafter described.

Mounted above plate 60 is a fifth round plate 70.

Plate 60 is freely disposed between plates 50 and 70, and plate 60 has a frictionless bearing 64, which bears on plates 50 and 70 and permits easy, slidable movement of plate 60 between plates 50 and 70.

The entire assembly of plates 40, 50, 60 and 70 is held in place by a bolt 80, disposed in an axially aligned bore 82, said bore 82 being enlarged when it passes through plate 60 so as not to impede the free slidable movement of plate 60 between plates 50 and 70. Bolt 80 has a head 84 and may have a washer 85 mounted under head 84. Washer 85 may bear directly on plate 70, or, if desired, on an insert plate 86 disposed in a groove 87 in plate 70. The threaded end 88 of bolt 80 is in threaded engagement with a coupling 89 disposed in plates 40 and 50, said coupling being secured in position by a nut 89a.

A brake shoe 90 is disposed so as to bear on the outer edges of plates 50 and 70. Brake shoe 90 is mounted on the outer edge of plate 60 by means of a protruding threaded stud 92 disposed in a threaded bore in plate 60, and a coil spring 94 is mounted on stud 92 between plate 60 and brake shoe 90, and disposed so as to bias brake shoe 90 outwardly from plates 50, 60 and 70. A handle 96 is mounted on the free protruding end of stud 92 by any suitable means, such as by a set screw 97. Stops 98 may also be mounted on brake shoe 90.

Turning of stud 92 by manipulation of handle 96 against the biasing action of spring 94 will bring brake shoe 90 into contact with the outer edges of plates 50 and 70, and thus secure plate 60 at any desired position around the periphery of plates 50 and 70. Turning of stud 92 in the opposite direction will allow spring 94 to bias brake shoe 90 outwardly, away from contact with plates 50 and 70, and permit the free slidable movement of plate 60 relative to plates 50 and 70.

Mounted on and extending upwardly from extension 62 of plate 60 is a headed stud 100, which is disposed adjacent the outer protruding end of extension 62. Bracing studs 102 are also mounted on extension 62 and extend downwardly therefrom.

A seat support bracket 110 is provided. One end of bracket 110 is of a substantially lazy Y configuration, having an upper arm 112 and a lower arm 114. Adjacent the outer end of arm 112 a bayonet slot 116 is provided, said bayonet slot 116 being designed so as to receive the head of stud 100 at the outer end of slot 116, and the secure bracket 110 on stud 100 by sliding arm 112 outwardly from stud 100.

The outer end of lower arm 114 is designed to abut against studs 102 and thus support bracket 110 on plate 60 when upper arm 112 is securely mounted on stud 100.

A seat 120 is slidably mounted on bracket 110 by means of sleeve brackets 122 which permit the selective positioning of seat 120 at any desired position along bracket 110. A stop 124 is mounted adjacent the outer protruding end of bracket 110 and disposed so as to abut against one of said sleeve brackets 122 and prevent seat 120 from sliding off said outer protruding end of bracket 110.

A plurality of riser posts 130 are mounted on plate 70 and extend upwardly therefrom. Posts 130 support a sixth round plate 132. For convenience of manufacture, posts 130 may be hollow, and a bolt 134 may be disposed in each of said hollow posts 130, the head 135 of each bolt 134 being disposed in a recess in plate 132, each said bolt 134 passing through an aligned bore in plate 132, then through a hollow post 130, and then through an aligned bore in plate 70 to a recess in plate 70. Each bolt 134 has a nut 136 threadably mounted thereon and disposed in a recess in plate 70.

If it is desired to increase the height of the camera dolly, a riser 140, consisting of a base plate 142, a plurality of riser posts 144, and a top plate 146, may be seated on plate 132. For firm mounting of base plate 142 on plate 132, an annular groove 147 may be provided in plate 132, said groove 147 accommodating a mating projecting annular flange 148 on base plate 142. Base plate 142 is joined to plate 132 by any suitable means, such as by an axially disposed coupling 149.

A camera 150, such as that illustrated in FIGURE 1 of the drawings, is suitably mounted on top plate 146 of riser 140. Camera 150 has an eye piece or finder 152, and a camera directional control mechanism 154.

With bracket 110 firmly affixed to plate extension 62, a cameraman 160 seats himself on seat 120 and slides seat 120 along bracket 110 to a convenient position. Brake shoe 90 is loosened, so that plate 60 may slide freely between plates 50 and 70, thus permitting cameraman 160 to swing about until his eyes are comfortably aligned with eye piece 152 of camera 150, and his hands are comfortably positioned on directional control mechanism 154.

If in the operation of camera 150, camera 150 is to be rapidly and frequently swung about, as when a fast moving street scene is to be photographed, brake shoe 90 may be left loosened, so that cameraman 160 may rapidly swing himself about by merely pushing with his feet on any part of the camera dolly. He may then easily and comfortably keep his eyes aligned with eye piece 152, and keep his hands comfortably positioned on directional control mechanism 154, without changing his position on seat 120, regardless of the rapid swinging of camera 150.

If, on the other hand, camera 150 is to remain in a substantially fixed position for any appreciable length of time, as when limited action is to be photographed, handle 96 may be manipulated to tighten brake shoe 90 so as to maintain cameraman 160 in a fixed position relative to eye piece 152 and mechanism 154 for the duration of the limited action camera shots.

Because the seat of the present invention is mounted on the dolly, cameraman 160 will not have to change his seated position when the dolly is raised or lowered, because the seat will rise and lower with the dolly, and his effective position relative to finder 152 and mechanism 154 may be maintained regardless of the height of the dolly.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equiqalent structures and devices.

What is claimed is:

1. An adjustable technician's seat for use in conjunction with a camera dolly which comprises: a substantially vertical and elevatable camera support member; a first substantially round plate horizontally and axially mounted on said support member intermediate the ends thereof; a second substantially round plate horizontally and axially mounted on said support member and spaced apart from said first plate; a third substantially round plate slidably interposed between said first and second plates for 360° rotational movement between said first and second plates; an extension on said third plate extending beyond the peripheral edges of said first and second plates; a bracket mounted on said extension and projecting outwardly from said plates; and a technician's seat mounted on said bracket.

2. An adjustable technician's seat for use in conjunction with a camera dolly, as defined in claim 1, wherein said first and second plates are of substantially the same diameter, and said third plate is of lesser diameter.

3. An adjustable technician's seat for use in conjunction with a camera dolly, as defined in claim 2, including a brake shoe adjustably mounted on the peripheral surface of said third plate and disposed so as to be brought into and removed from contact with the peripheral edges of said first and second plates so as to arrest or release the slidable rotational movement of said third plate relative to said first and second plates.

4. An adjustable technician's seat for use in conjunction with a camera dolly, as defined in claim 3, wherein said brake shoe is pivotally mounted on a threaded stud disposed in a threaded bore in the periphery of said third plate, and including a coil spring mounted on said stud so as to bias said brake shoe outwardly from said plates; and a handle mounted on the protruding end of said stud externally of said brake shoe, whereby manipulation of said handle in one direction will bring said brake shoe into firm abutting contact with the peripheral edges of said first and second plates against the biasing action of said spring, and manipulation of said handle in the opposite direction will release said brake shoe from said contact.

5. An adjustable technician's seat for use in conjunction with a camera dolly which comprises: a substantially vertical and elevatable camera support member; a first substantially round plate horizontally and axially mounted on said support member intermediate the ends thereof; a second substantially round plate mounted on said support member substantially parallel to said first plate and spaced apart from said first plate, said second plate being of substantially the same diameter as said first plate; a third substantially round plate slidably interposed between said first and second plates for 360° rotational movement therebetween, said third plate being of lesser diameter than said first and second plates; a frictionless bearing on said third plate and bearing on said first and second plates; adjustable braking means mounted on the peripheral edge of said third plate and disposed so as to be brought into and released from abutting contact with the peripheral edges of said first and second plates; an extension on said third plate extending beyond the peripheral edges of said three plates; a bracket mounted on said extension and projecting outwardly from said plates; and a technician's seat mounted on said bracket.

6. An adjustable technician's seat for use in conjunction with a camera dolly, as defined in claim 5, wherein said seat is slidably mounted on said bracket for selective positioning along said bracket intermediate the ends of said bracket.

7. An adjustable technician's seat for use in conjunction with a camera dolly, as defined in claim 6, including a stop on said bracket adjacent the outer end of said bracket so as to arrest the slidable movement of said seat along said bracket.

References Cited in the file of this patent
UNITED STATES PATENTS

| | | |
|---|---|---|
| 1,922,134 | Jones | Aug. 15, 1933 |
| 2,073,998 | Raby | Mar. 16, 1937 |
| 2,595,921 | Butz | May 6, 1952 |
| 2,725,783 | Jackson | Dec. 6, 1955 |